United States Patent [19]
Olson

[11] Patent Number: 5,253,352
[45] Date of Patent: Oct. 12, 1993

[54] METHOD AND APPARATUS FOR PIPELINING CACHE ACCESSES USING ANTICIPATORY INITIATION OF CACHE READ

[75] Inventor: Anthony M. Olson, Stevensville, Mich.

[73] Assignee: Zenith Data Systems Corporation, Buffalo Grove, Ill.

[21] Appl. No.: 435,880

[22] Filed: Nov. 13, 1989

[51] Int. Cl.⁵ .............................................. G06F 13/00
[52] U.S. Cl. ................................... 395/425; 395/550;
364/238.4; 364/243.41; 364/231.8; 364/948.34;
364/964.26; 364/968; 365/233
[58] Field of Search ................................ 395/425, 550;
365/189.01, 233; 364/200 MS File, 900 MS File

[56] References Cited
U.S. PATENT DOCUMENTS
4,872,138 10/1989 Ciacci ............................. 365/189.01

Primary Examiner—Glenn Gossage
Attorney, Agent, or Firm—Charles MacKinnon

[57] ABSTRACT

A high speed memory component, such as a cache RAM (random access memory), has a bidirectional data line and a control line (CDRAMOE) which, when respectively set to first and second electrical states, causes the memory component to respectively output data onto and accept data from the bidirectional data line. An arrangement is provided to initiate transfers of data to and from the memory component on the bidirectional data line and to produce at a first point in time a valid indication signal (W/R) indicating that one of a data read and a data write is being initiated. A method and apparatus for controlling the memory component involve the control line being set to the second electrical state at a second point in time prior to the first point in time, and the control line being maintained in the second electrical state from the second point in time to the first point in time.

10 Claims, 5 Drawing Sheets

METHOD AND APPARATUS FOR PIPELINING CACHE ACCESSES USING ANTICIPATORY INITIATION OF CACHE READ

FIELD OF THE INVENTION

The present invention relates to a high speed memory and a method of controlling it and, more particularly, to a method and apparatus facilitating use of relatively slow memory chips with a high speed central processing unit without sacrificing processing unit speed.

BACKGROUND OF THE INVENTION

Commercially available integrated circuit memory chips are available with a wide range of access speeds, the access speed being the time required for the memory chip to output selected data from the point in time at which it receives control signals such address information or an enable. Faster memory chips typically cost significantly more than slower memory chips.

One common type of memory chip has a bidirectional data line on which it can both accept and output data, and has a directional control line which, when respectively set to different electrical states, causes the memory component to respectively output onto and accept data from the bidirectional data line. With memory chips of this type, the access time required from the point in time at which an address is presented to the chip until the point in time when the chip outputs valid data traditionally was significantly longer than the access time from a stable signal on the control line to valid data out. In a system, a central processing unit (CPU) typically outputs an address before it provides a control signal to indicate whether the memory chip should output data, and the access time of memory components from address in to data out was sufficiently greater than the access time from control signal in to data out that the latter access time was negligible for purposes of system design.

However, due to advances in technology, the memory component access time from address in to data out has been decreasing relative to the access time from directional control in to data out, and in some cases the former is only a little longer than the latter. Also, CPUs are being designed which are much faster than their recent ancestors. As a result, since as mentioned above the address information is usually provided by the CPU prior to the directional control signal, in certain situations the critical path for propogation delays has become the access time from directional control in to data out rather than the access time from address in to data out. Consequently, it is sometimes necessary to use memory chips which are faster and thus more expensive than would be the case if the critical path for propogation delays depended on the access time from address in to data out.

Accordingly, an object of the present invention is to provide a method and apparatus for controlling a memory component used with a CPU which ensures that the access time from address in to data out rather than the access time from directional control in to data out is the criteria determining the critical path for propogation delays.

A further object is to achieve this result inexpensively, and without the addition of any significant hardware or software.

The objects and purposes of the invention, including those set forth above, are met by providing a method and apparatus in which a high speed memory component has a bidirectional data line and a control line which, when respectively set to first and second electrical states, causes the memory component to respectively output data onto and accept data from the bidirectional data line, and in which an arrangement is provided to initiate transfers of data to and from the memory component on the bidirectional data line and to produce at a first point in time an indication that one of a data read and a data write is being initiated, the control line being set to the second electrical state at a second point in time prior to the first point in time, and the control line being maintained in the second electrical state from the second point in time to the first point in time.

An advantage of the inventive approach is that, when using a very high speed state-of-the-art CPU, it is possible to keep the CPU running at optimum speed by using commercially available memory components, whereas without the inventive approach no commercially available memory component would be fast enough to keep the very high speed CPU running at optimum speed.

BRIEF DESCRIPTION OF THE DRAWINGS

A preferred embodiment of the invention is described in detail hereinafter with reference to the accompanying drawings, in which.

DETAILED DESCRIPTION

Figure 1:
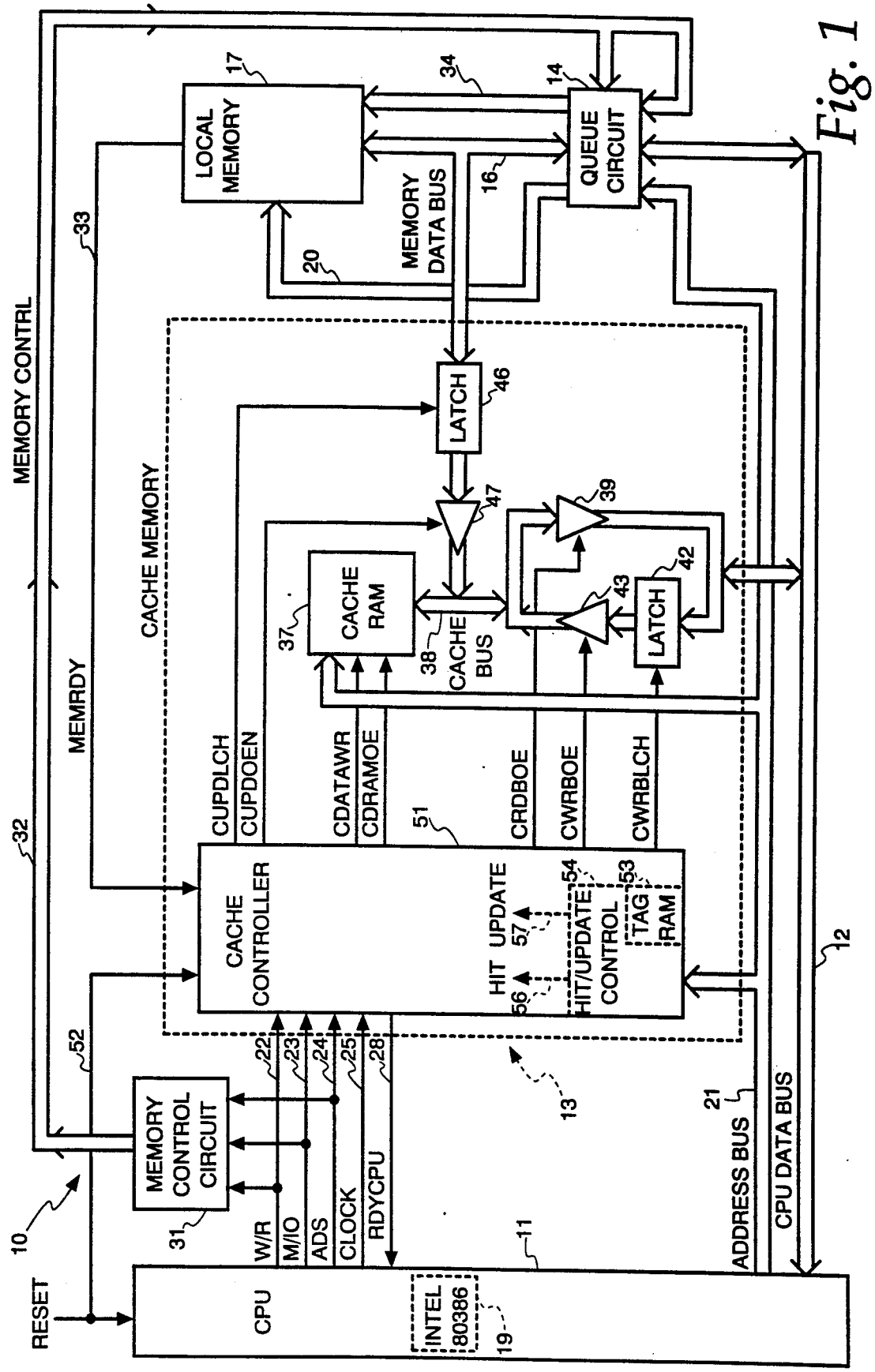
FIG. 1 is a block diagram of a computer system embodying the present invention.

Referring to FIG. 1, a computer system 10 embodying the present invention includes a central processing unit (CPU) 11 coupled by a 32-bit bidirectional CPU data bus 12 to a cache memory 13 and a queue circuit 14, the queue circuit 14 being coupled by a 32-bit bidirectional memory data bus 16 to a local memory 17.

In the preferred embodiment, the CPU 11 includes an Intel 80386 microprocessor 19 marketed by Intel Corporation of Santa Clara, Calif., but other conventional and commercially available microprocessors could be utilized for the CPU 11. The CPU 11 can output addresses on a 26-bit address bus 21. The CPU outputs on a line 22 a control signal W/R which indicates whether the CPU 11 is writing data to or reading data from another component of the computer system 10, outputs on a line 23 a control signal M/IO which indicates whether the object of the data transfer is a memory device or an input/output device, outputs on a line 24 a control signal ADS which indicates that an address on the address bus 21 is valid and which thus essentially signals the start of a memory cycle or input/output cycle, and outputs on a line 25 a clock signal CLOCK which has twice the frequency of the primary internal clock of the Intel 80386. In the preferred embodiment, the primary clock for the Intel 80386 is 25 Mhz, and the signal CLOCK on line 25 has a frequency of 50 Mhz, but other frequencies could be used. The CPU receives from the cache memory 13 on a line 28 a signal RDYCPU, which will be explained in more detail later.

The local memory 17 is entirely conventional and thus need not be described in detail, but it is described briefly for purposes of convenience. Local memory 17 includes a plurality of selectively addressable storage locations. The address bus 21 is, through queue circuit 14, coupled at 20 to address inputs of the local memory 17 in order to select one of the memory locations therein. A memory control circuit 31 has three inputs respectively connected to the control lines 22, 23 and 24 from the CPU 11, and has outputs 32 which are coupled to and control queue circuit 14 and which, through queue circuit 14, are coupled at 34 to and control the local memory 17. For example, the control lines 32 specify whether or not data is to be read from or written to the memory 17, and control the timing of the read or write. The memory control circuit 31 and the manner in which it controls the memory 17 are entirely conventional, and therefore not described here in detail. When the memory 17 is being written, address, data and control signals from the lines 21, 12 and 32 are stored in queue circuit 14 and then subsequently used to effect a write of that data into a location in memory 17 selected by that address. When the local memory 17 is being read, the queue circuit 14 passes signals on lines 21 and 32 through to memory 17 and data in a storage location selected at 20 by the address bus 21 is output onto the memory data bus 16.

When the CPU 11 is reading data from the local memory 17, the queue circuit 14 is substantially electrically transparent, so that address and control signals pass through queue circuit 14 to memory 17, and data from the memory 17 passes across memory data bus 16 and through queue circuit 14 to the CPU data bus 12. On the other hand, when the CPU 11 is sending data across the data bus 12 to the memory 17, the queue circuit 14 is not electrically transparent. In particular, the queue circuit 14 includes a conventional first-in/first-out stack (not illustrated), and address, data and control signals from the lines 21, 12 and 32 are entered into the stack. Data from the stack is written into the memory 17 (using the associated stored address and control information) in a sequence which is identical to the sequence in which it was entered into the stack. The queue circuit 14 is controlled by some of the control lines 32 from the control circuit 31. The queue circuit 14 is conventional and not a part of the present invention, and therefore not described here in detail.

The purpose for the conventional queue circuit 14 is described briefly here for purposes of completeness. The purpose of the queue circuit 14 is to increase the efficiency of the CPU 11. In particular, the local memory 17 is relatively slow in comparison to the CPU 11. If, when the CPU 11 transmits a word across the data bus 12 to the local memory 17, the CPU 11 had to wait for the word to be fully stored directly in the memory 17 before the CPU 11 could continue, the CPU would have to sit idle while the somewhat slower memory 17 effected storage of the word, which would be relatively inefficient. Therefore, the CPU transmits the word to the stack in the queue circuit 14 without stopping, after which the word is transferred from the queue circuit 14 to the local memory 17 at a slower speed compatible with the local memory 17, while simultaneously the CPU 11 proceeds to perform other operations at a high speed. For example, a particular program may, after outputting data for the local memory 17 on bus 12, proceed to do certain data transfers between different registers internal to the CPU 11. The CPU can carry out these internal register transfers during the period of time when the queue circuit 14 is storing the data word in the local memory 17, rather than waiting for the data word to be fully stored in the memory 17 before beginning the transfers between internal registers. Also, the CPU may execute a program loop which is in the cache memory 13 and which processes only data already present in the CPU 11 or in cache memory 13. This permits the CPU 11 to operate more efficiently because, on average, it spends less time sitting idle waiting for the memory 17.

The cache memory 13 includes a cache random access memory (RAM) 37 having thirty-two bidirectional data outputs which are connected to a 32-bit cache bus 38, the cache bus 38 being coupled through thirty-two tri-state buffers shown collectively at 39 to the CPU data bus 12. The CPU data bus 12 is connected to inputs of a 32-bit latch 42, the outputs of the latch 42 being coupled through thirty-two tri-state buffers 43 to the cache bus 38. The 32-bit memory data bus 16 is coupled to inputs of a 32-bit latch 46, the outputs of which are coupled through thirty-two tri-state buffers 47 to the cache bus 38.

The cache RAM 37 has a plurality of selectively addressable storage locations, and can access a selected location much faster than the local memory 17. The cache RAM 37 has address inputs which are coupled to lines of the address bus 21, so that one of the storage locations in the RAM 37 is selected by the state of those lines of the address bus 21.

The cache memory 13 also includes a cache controller circuit 51, which receives on line 33 from local memory 17 a signal MEMRDY, receives on line 52 a system reset signal which is also applied to the CPU 11, and receives selected address lines from the address bus 21. The cache controller circuit 51 includes a conventional tag RAM 53, and a conventional hit/update control circuit 54. The tag RAM 53 and hit/update control circuit 54 are basically conventional, and are thus described only briefly for purposes of completeness.

The cache memory 13 is smaller than and faster than the local memory 17. The cache memory 13 stores a duplicate of the data in a number of the locations in the memory 17, for example locations in the memory 17 which have been recently read. Thus, the cache memory 13 essentially stores in the RAM 37 a mirror image of the data in each of a number of selected locations in the local memory 17. In a conventional manner, the tag RAM 53 stores, for each data word in the cache RAM 37, information identifying the location in local memory 17 which stores the same data. When the CPU 11 attempts to read a data word from the local memory 17, the hit/update control circuit 54 of cache controller 51 compares the address on address bus 21 with the data in tag RAM 53 in order to determine whether the cache RAM 37 happens to contain a duplicate of the data which the CPU 11 is requesting from local memory 17. If the hit/update control circuit 54 determines that the cache RAM 37 in fact contains the requested data, it enables the signal HIT on line 56, which causes cache memory 13 to place the requested data on the data bus 12 so that the CPU 11 has the data faster than if it had to wait for the data to be retrieved from the slower local memory 17. If the hit/update control circuit 54 determines that the cache RAM 37 does not contain a duplicate of the requested data, it does not enable the HIT line 56. Instead, it determines whether the address on bus 21 corresponds to a location of the local memory 17 which the cache memory 13 is permitted to duplicate. (A simple example of this would be where the cache memory 13 is permitted to store duplicate data for locations in the local memory 17 having hexadecimal addresses below 1,000,000, and is not permitted to store duplicate data for locations in the memory 17 having addresses greater than or equal to 10,000,000).

Turning to writes, when the CPU 11 is transmitting data across the data bus 12 to the local memory 17, the hit/update control circuit 54 determines whether the location in memory 17 selected by address lines 21 is currently duplicated in the cache RAM 37 and, if it is, enables the HIT line 56 and the UPDATE line 57, as a result of which the cache controller 51 causes the data word on the CPU data bus 12 to pass through the latch 42 and buffer 43 and to be stored in the appropriate location of cache RAM 37.

The cache controller 51 produces several control signals, including a control signal CUPDLCH which controls the latch 46, a control signal CUPDOEN which controls the tri-state buffer 47, a control signal CDATAWR which instructs the cache RAM 37 to accept and store data from the cache bus 38, a control signal CDRAMOE which is commonly called an output enable but is essentially a directional control indicating to the cache RAM 37 whether its circuitry coupled to the cache bus 38 is to be used to output data onto the bus 38 or to accept data from the bus 38, a control signal CRDBOE which controls the tri-state buffer 39, a control signal CWRBOE which controls the tri-state buffer 43, a control signal CWRBLCH which controls the latch 42, and the control signal RDYCPU provided on line 28 to the CPU 11. The specific manner in which the cache controller 51 generates these control signals in response to the control signals which it receives as inputs will be described in more detail later.

Figure 5:
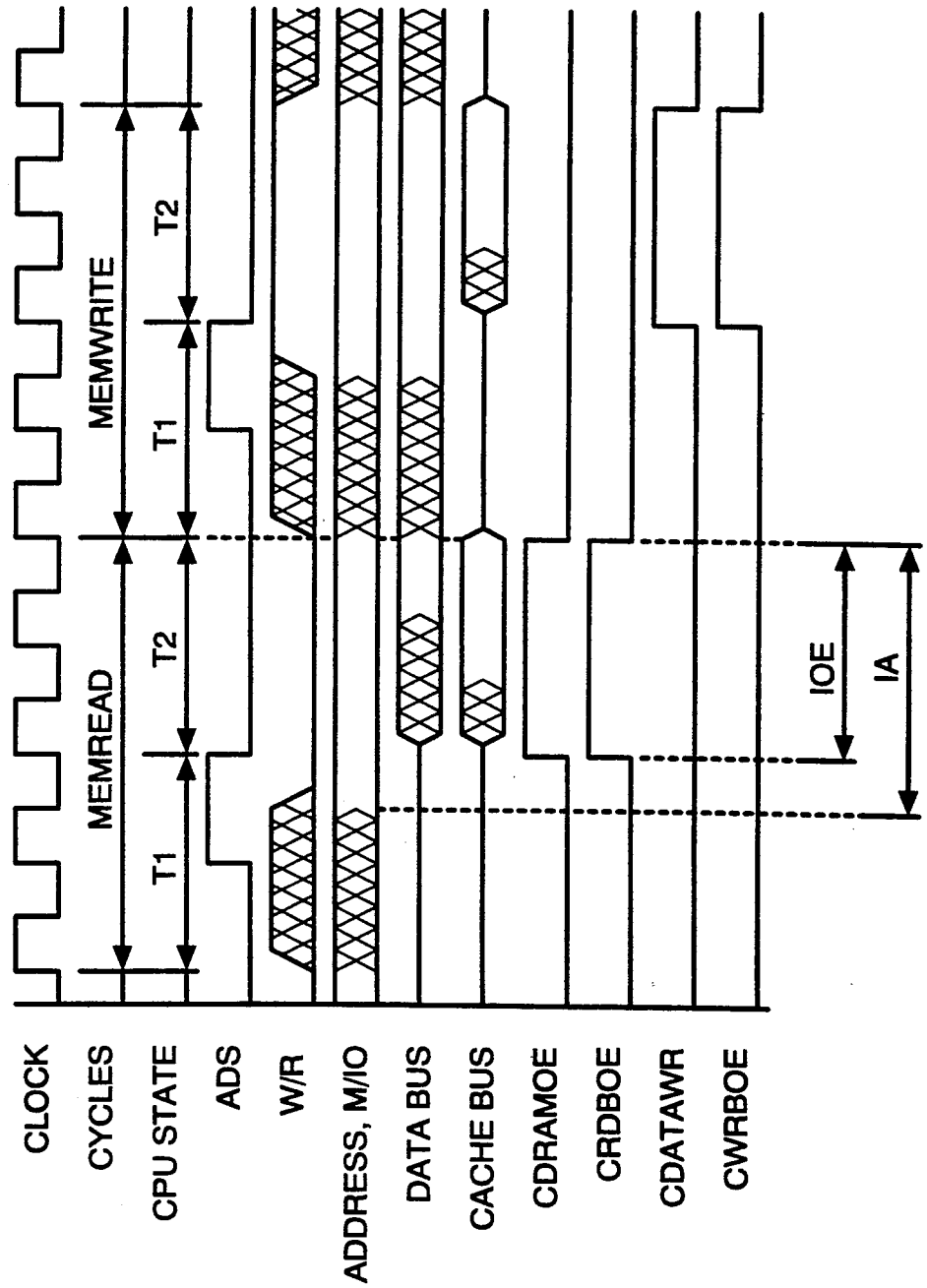
FIG. 5 is a timing diagram showing the inter-relationships between certain signals which would be generated by a conventional computer system of the type shown in FIG. 1 which did not include the subject matter of the present invention.

FIG. 5 is a timing diagram showing how a system of the type shown in FIG. 1 would be controlled according to conventional control techniques. FIG. 5 shows a conventional memory read cycle followed by a conventional memory write cycle, each consisting of two CPU states $T_1$ and $T_2$. The CPU outputs a control signal W/R which indicates whether the CPU is performing a read or write cycle, and outputs a control signal M/IO which indicates whether the CPU is performing a memory cycle or an input/output cycle. During a write cycle, the CPU outputs data on the data bus 12. The CPU also outputs for each cycle a control signal ADS, the trailing edge of which indicates that the various address, control and data signals produced by the CPU are valid. It is important to note that the trailing edge of the control signal ADS does not occur until the end of the first CPU state $T_1$ of each memory read or memory write cycle. Thus, when attempting to operate a cache memory according to the conventional approach at a speed consistent with the highest possible speed of the CPU, only the time period represented by the CPU state $T_2$ is available for the cache memory to access and output data during a memory read, because it is not known until the beginning or the CPU state $T_2$ (end of CPU state $T_1$) whether the CPU is performing a read or write and, in the case of a read, the data must be obtained and supplied to the CPU by the end of the memory cycle, which is the end of the cycle $T_2$ (in order to keep the CPU running at full speed). The output enable CDRAMOE for the cache RAM is not activated in the conventional approach until the start of state $T_2$, when it is known that the CPU is in fact performing a read. Thus, the interval $I_{OE}$ from the application of the output enable until the end of the state $T_2$ can be the critical path with respect to propogation delays, since the interval $I_4$ from the application of an address until the end of state $T_2$ is longer than interval $I_{OE}$. This is particularly true when working with memory chips where the address in to data out propogation delay is comparable to the directional signal in to data out propogation delay. Obviously, it is always possible to use still higher-speed memory chips for the cache memory, but this increases the overall system cost. On the other hand, if high-speed chips which are slightly slower than those just mentioned are used in order to minimize cost in a conventional arrangement of the type shown in FIG. 5, the CPU must quite literally be run at a lower overall speed so that the duration of the CPU state $T_2$ is longer and, in particular, is sufficiently long to permit the slower memory chips in the cache memory to access the data requested by the CPU and supply it to the CPU within the CPU state $T_2$. Obviously, slowing down the speed of the CPU will directly reduce the speed at which the CPU accomplishes its processing tasks and will thus reduce overall system efficiency.

Figure 2:
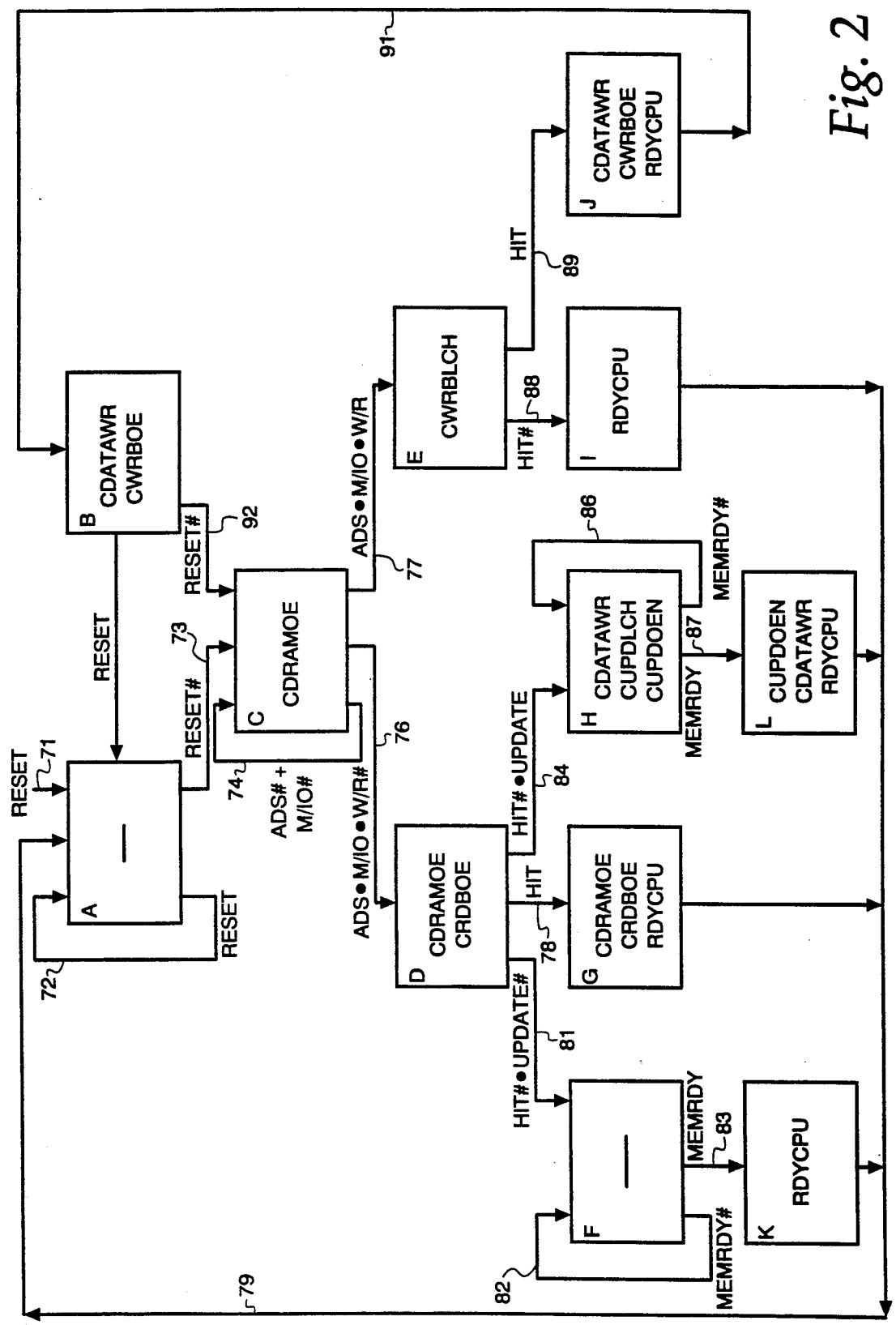
FIG. 2 is a state diagram depicting diagrammatically the operation of a control circuit which is a component of the computer system of FIG. 1.

Turning back to the present invention and the manner in which it avoids these problems, the portion of the cache controller circuit 51 which generates various output signals is essentially a state machine, and FIG. 2 is a state diagram for the state machine. In the preferred embodiment, there are additional states which are not shown in FIG. 2 but, for convenience and clarity, only those states which are pertinent to an understanding of the present invention are illustrated. The state diagram of FIG. 2 shows twelve controller states which are each represented by a respective block and are each labeled with a respect letter A through L, and the presence of a signal name in a block means that the signal is activated when the state machine is in the state represented by the block. If no signals are activated in a given state, then the associated block in FIG. 2 contains no signal names. Each time the signal CLOCK on line 25 (FIG. 1) has a rising edge, a transition is made in the state diagram of FIG. 2 from the current controller state to the next controller state, the next controller state being in some cases the same as the current state.

More specifically, a system reset forces the state machine of FIG. 2 into controller state A, as shown at 71, where no output signals are generated. So long as there is a system reset signal present on line 52 in FIG. 1, each rising edge of the signal CLOCK on the line 25 will cause the state machine to stay in state A, as shown diagrammatically at 72. When the reset signal on line 52 terminates, the next rising edge of the signal CLOCK causes the state machine to move to state C as shown by arrow 73. (In this disclosure, the symbol "*" following a signal name indicates that the complement of the signal is being referenced.) The symbol "#" is also sometimes used in the art, as is a line or bar over the signal name. In state C, the state machine generates output signal CDRAMOE, which as shown in FIG. 1 is an indication to the cache RAM 37 that it should output data onto the cache bus 38. The state machine remains in state C, as shown at 74, until the CPU simultaneously activates both of the signals ADS and M/IO, indicating that the CPU is carrying out a memory cycle, which may be either a memory read or a memory write. Then, on the next leading edge of the signal CLOCK, the state machine changes to controller state D at 76 if the CPU signal W/R indicates that the memory cycle is a read or changes to state E at 77 if the CPU signal W/R indicates that the memory cycle is a write. In state D, the controller 51 continues to generate output signal CDRAMOE, and also generates output signal CRDBOE, which enables the tri-state buffer 39 so that data output by the cache RAM 37 on the cache bus 38 is transmitted to the CPU 11 through the buffer 39 and across the data bus 12. The state machine then transitions to one of the states F, G and H in dependence on the state of the internal signal HIT and the internal signal UPDATE respectively shown at 56 and 57 in FIG. 1. In particular, if the circuit 54 has activated the signal HIT, it means that the cache RAM 37 contains a duplicate of the particular data which the CPU has requested from the local memory 17. The state machine therefore transitions to state G, where it continues to generate the signals CDRAMOE and CRDBOE, and also generates the signal RDYCPU in order to notify the CPU that the requested data is present on the data bus 12 and that the CPU can take it and proceed. From state G, the state machine transitions unconditionally back to state A at 79. On the other hand, if it is determined in state D that the signal HIT is not activated, it means that the cache RAM 37 does not presently contain a duplicate of the data which the CPU has requested from the local memory 17, and thus it is necessary for the local memory 17 to supply the requested data across data bus 12 to the CPU 11. The cache controller 51 therefore checks the internal signal UPDATE at 57 in order to determine whether the cache RAM 37 should be updated, or in other words whether or not a duplicate of the data which the memory 17 is sending to the CPU 11 should be stored in the cache RAM 37 so that, if the CPU 11 requests it again, the cache memory 13 can provide it quickly to the CPU 11. If the signal UPDATE is not activated, then the state machine transitions from state D to state F at 81, where it outputs no control signals. The memory 17 is relatively slow, and the state machine therefore waits in state F at 82 until the memory 17 finally activates the signal MEMRDY on line 33 to indicate that it has placed the requested data on the data bus 12, and then the state machine transitions at 83 to the state K where it produces the signal RDYCPU to the CPU 11 to indicate that the requested data is present on the data bus 12 and the CPU can accept the data and proceed. Then, the state machine transitions unconditionally at 79 from state K back to state A. If the state machine found at state D that the signal UPDATE was activated, then the state machine transitions at 84 to the state H. The states H and L are somewhat similar to states F and K, in that the state machine waits at 86 in state H until the memory 17 generates the signal MEMRDY to indicate the requested data is on the bus 12, and then transitions at 87 to state L where it produces the signal RDYCPU to indicate to the CPU that the requested data is on the bus 12. However, in states H and L, the state machine produces additional signals which cause the data being sent by the memory 17 across bus 12 to the CPU 11 to also be written into the cache RAM 37. In particular, in state H, the CPU produces the signal CDATAWR to place the cache RAM 37 in write mode, produces the signal CUPDLCH to enable the latch 46 to pass data from its inputs to its outputs, and enables the signal CUPDOEN to cause the tri-state buffer 47 to transmit data from the latch 46 to the cache RAM 37 across cache bus 38. As the state machine transitions from state H to L, it disables the signal CUPDLCH in order to latch into latch 46 the data from local memory 17, while continuing to generate the signals CUPDOEN and CDATAWR in order to complete the write of data into the RAM 37 while generating the signal RDYCPU. From state L, the state machine transitions unconditionally at 79 back to state A.

Turning again to state C, and as mentioned above, if the CPU determines that the memory is carrying out a memory write, the state machine will transition from state C to state E at 77. In state E, the controller 51 generates the signal CWRBLCH so that the latch 42 transmits from its inputs to its outputs the data which the CPU 11 has placed on the data bus. Meanwhile, the cache controller 51 examines its internal signal HIT in order to determine whether the cache RAM 37 contains a duplicate of the data in the location of memory 37 which the CPU is changing. If the cache RAM does not contain a duplicate of the data and thus the signal HIT is not activated, the state machine will transition from state E to state I at 88, where it will produce the signal RDYCPU to indicate that the CPU should continue. On the other hand, if the signal HIT is activated, the state machine transitions at 89 to state J. During this transition, the signal CWRBLCH is deactivated so that the data from the CPU is latched into the latch 42. Then, in state J, in addition to the signal RDYCPU, the state machine generates the signals CWRBOE to cause the buffer 43 to supply the data in latch 42 across cache bus 38 to cache RAM 37, and generates CDATAWR to cause the cache RAM 37 to store the data. Then, the state machine transitions unconditionally from state J to state B, where it continues to generate the signals CWRBOE and CDATAWR in order to complete the write of data into the RAM 37. The state B is essentially substituted for the state A when data is being written into the cache RAM 37 during a memory write cycle, the state B differing from the state A in that the signals CWRBOE and CDATAWR are activated in state B but not state A. So long as the system reset line is not activated, the state machine will transition from state B to state C at 92, which corresponds functionally to the transition from state A to state C at 73.

As mentioned above, when the CPU 11 is writing data to the local memory 17, the data is actually deposited into the stack in the queue circuit 14, and the CPU 11 proceeds with its processing rather than waiting for the local memory 17 to actually store the data. The queue circuit 14 carries out this task in the background while the CPU 11 is proceeding with its subsequent processing. Consequently, in the controller states I and J in FIG. 2, the state machine does not wait for the local memory in a manner similar to the waits shown at 82 and 86 for states F and H.

Those of ordinary skill in the art are thoroughly familiar with state diagrams and how to generate a logic circuit to implement a state diagram. As an example, the book "Switching and Finite Automata Theory" by Zvi Kohavi of the Massachusetts Institute of Technology, published in 1970 by McGraw-Hill, Inc. of New York, includes a clear explanation of how to generate a logic circuit implementing a state diagram of the type shown in FIG. 2. Accordingly, it is not necessary to disclose a specific circuit here to implement the state diagram of FIG. 2.

Figure 3:
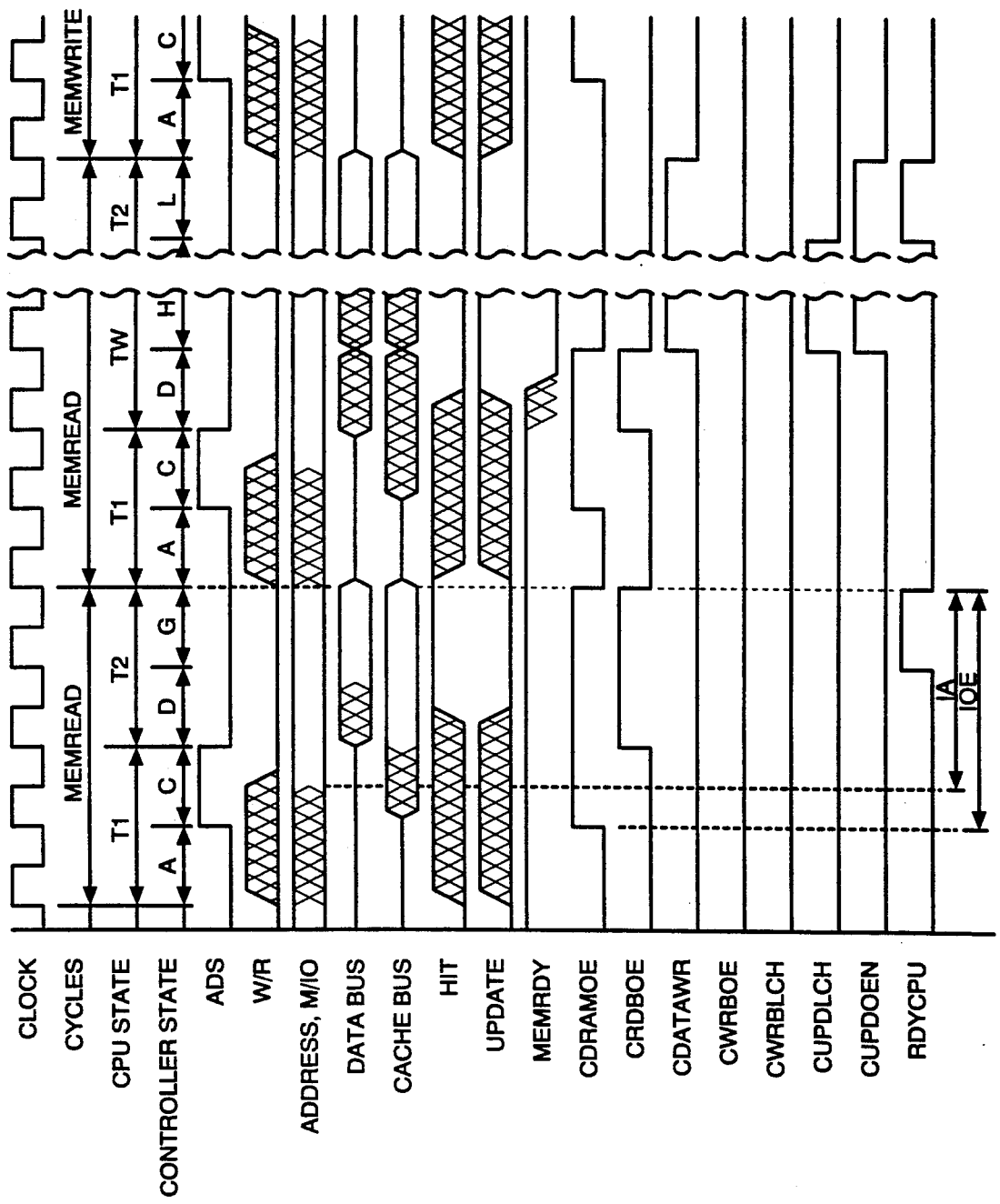
FIGS. 3 and 4 are timing diagrams showing the interrelationships of certain signals generated by the computer system of FIG. 1.
Figure 4:
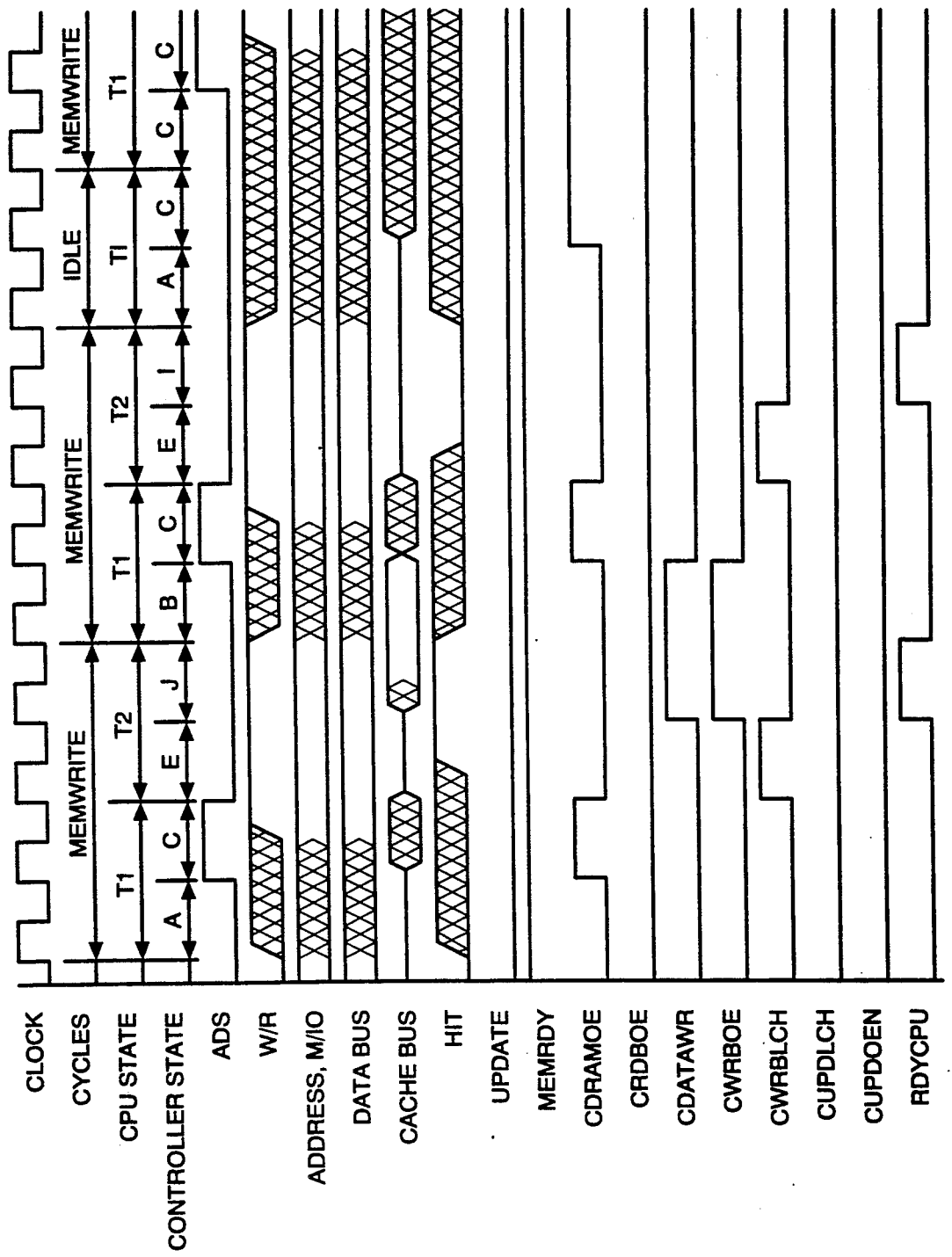

FIGS. 3 and 4 are timing diagrams which show the specific sequence of control signals generated by the controller circuit 51 according to the state diagram of FIG. 2, and for convenience in correlating FIGS. 3 and 4 with FIG. 2, the fourth line in each of FIGS. 3 and 4 shows the succession of controller states of FIG. 2 which takes place during the generation of the signals shown in FIGS. 3 and 4. FIG. 3 shows two consecutive memory read cycles, the first being a cycle in which the cache memory 13 includes a duplicate of the data requested from the memory 17 and the second being a cycle in which the cache memory 13 does not include a duplicate of the data so that it is necessary to wait for the relatively slow memory 17 to access the data and supply it to the CPU. In FIG. 3, it is important to note that, in each memory cycle, the signal CDRAMOE is enabled at the end of the controller state A, which is halfway through the CPU cycle $T_1$. In other words, CDRAMOE is enabled at a point in time significantly before the end of the CPU state $T_1$ which, as mentioned above, is the point at which it can actually be determined whether the CPU is carrying out a read or write cycle. The state machine is thus anticipating that the CPU will carry out a read cycle at a point in time before it is known whether the CPU is actually going to do a read or write cycle, and instructs the cache RAM 37 using line CDRAMOE that a read is in progress. If it turns out that the CPU is in fact doing a read cycle, then with respect to the end of the cycle $T_2$ at which the CPU must have valid data, the output enable for the cache RAM has been provided starting in the middle of the CPU state $T_1$ rather than at the end of the state $T_1$, or in other words fifty percent earlier than in the conventional approach shown in FIG. 5. Thus, the interval $I_A$ from the time a valid address occurs on the address bus 21 until valid data must be present at the CPU 11 on data bus 12 is the same in FIG. 3 as in the conventional approach in FIG. 5, but the interval $I_{OE}$ from the time an output enable is presented to the cache RAM 37 until valid data must be present at the CPU 11 on data bus 12 is fifty percent longer in the inventive approach of FIG. 3 than the conventional approach of FIG. 5. Consequently, whereas the interval $I_{OE}$ in the conventional approach of FIG. 5 is the critical timing which forces selection of a very fast and expensive memory chip, in the inventive approach of FIG. 3 the interval $I_{OE}$ is much longer and so the critical interval is $I_A$, and selecting a memory chip to meet the limits of the interval $I_A$ in the approach of FIG. 3 permits a somewhat slower and cheaper high speed memory chip to be used in the approach of FIG. 3 without sacrificing CPU speed, thus permitting an overall reduction in system cost without any change in system performance.

FIG. 4 shows two consecutive memory write cycles, followed by an idle cycle (which means that the data bus 12 is idle rather than that the CPU is idle). One or more idle cycles may occur where the CPU is performing an instruction which does not access memory, for example a register to register transfer. Each of the memory write cycles includes two CPU states, namely states $T_1$ and $T_2$. As discussed above, it is not clear until the end of the state $T_1$ whether the CPU is in fact doing a read or a write. In the middle of state $T_1$, the inventive state machine assumes that the memory cycle will be a read cycle, and activates the signal CDRAMOE to give the cache RAM 37 a head start on a read in the manner discussed above. Since the memory cycles shown in FIG. 4 are write cycles, it is found in each case at the end of the CPU state $T_1$ that the CPU is doing a write rather than a read, and therefore the signal CDRAMOE is immediately terminated and the signals necessary for performing a write are carried out. Although the CPU only maintains the data it is outputting on the data bus 12 until the end of the CPU state $T_2$, that data is latched into the latch 42 by the signal CWRBLCH at the end of the controller state E, and it will be noted from the timing of the write signal CDATAWR to the cache RAM 37 that the actual writing of data into the cache RAM 37 carries through to the end of the controller state B, the controller state B being the first half of the first CPU state $T_1$ of the next successive memory cycle. It should be noted that this overlap does not in any way slow down the CPU. A further factor to note in FIG. 4 is that, halfway through the idle CPU state $T_1$ following the second memory write cycle, the state machine transitions from controller state A to controller state C and generates the signal CDRAMOE in anticipation that the next memory cycle will be a read cycle. Since the CPU is in fact not doing any memory cycle at all during the idle state $T_1$, the state machine simply remains in controller state C with the signal CDRAMOE enabled until the CPU does begin its next memory cycle. In essence, the state machine activates the signal CDRAMOE one CLOCK period after the end of each memory cycle.

Thus, FIG. 1 discloses an apparatus 10 in which the cache RAM 37 serves as a high speed memory component having at least one bidirectional data line 38 and having a control line CDRAMOE which, when respectively set to first and second electrical states (logic high and logic low states), causes the memory component 37 to respectively output data onto and to accept data from each bidirectional data line 38. The CPU 11 serves as a first means which initiates writes of data to, and reads of data from, the memory component (cache RAM) 37 on each bidirectional data line 38, the first means producing by a first point in time (the end of CPU state $T_1$ in FIGS. 3 and 4) a valid indication signal W/R indicating that one of a data read and a data write is being initiated. The cache controller 51 serves as a second means which sets the control line CDRAMOE to its first electrical state at a second point in time (the end of controller state A or B in FIGS. 3 and 4) prior to the first point in time and which maintains the control line CDRAMOE in the first electrical state independently of the indication signal W/R from the second point in time to the first point in time.

Although a preferred embodiment of the present invention has been described in detail for illustrative purposes, it will be recognized that variations or modifications may be made to the preferred embodiment without departing from the scope of the present invention.

The embodiments of the invention in which an exclusive property or privilege is claimed are defined as follows:

1. An apparatus comprising: a high speed memory component having a bidirectional data line and having a control line which, when respectively set to first and second electrical states, causes said memory component to respectively output data onto and accept data from said bidirectional data line; first means for initiating writes of data to and reads of data from said memory component on said bidirectional data line, said first means producing by a first point in time a valid indication signal indicating that one of a data read and a data write is being initiated; and second means for setting said control line to said first electrical state at a second point in time prior to said first point in time and for maintaining said control line in said first electrical state independently of said indication signal from said second point in time to said first point in time.

2. An apparatus as recited in claim 1, wherein said second means changes said control line from said first electrical state to said second electrical state in response to said first means indicating at said first point in time that a data write to said memory component is being initiated.

3. An apparatus as recited in claim 2, wherein said apparatus includes a first memory and a second memory each having a plurality of selectively addressable storage locations which can be selectively read and written by said first means, said second memory storing data which is a duplicate of data in selected locations of said first memory, said second means and said memory component being portions of said second memory, said second means including means, responsive to a memory read by said first means of data from a location in said first memory for which said second memory is to store a duplicate, for changing said control line of said memory component from said first electrical state to said second electrical state at a third point in time subsequent to said first point in time.

4. An apparatus comprising: a high speed memory component having a bidirectional data line and having a control line which, when respectively set to first and second electrical states, causes said memory component to respectively output data onto and accept data from said bidirectional data line; first means for initiating writes of data to and reads of data from said memory component on said bidirectional data line, said first means producing by a first point in time a valid indication signal indicating that one of a data read and a data write is being initiated; and second means for setting said control line to said first electrical state at a second point in time prior to said first point in time and for maintaining said control line in said first electrical state independently of said indication signal from said second point in time to said first point in time; wherein said memory component has a plurality of address inputs and said first means has a plurality of address outputs which are coupled to said address inputs of said memory component and on which said first means outputs an address for each memory read and memory write at a third point in time prior to said first point in time and subsequent to said second point in time.

5. An apparatus comprising: a high speed memory component having a bidirectional data line and having a control line which, when respectively set to first and second electrical states, causes said memory component to respectively output data onto and accept data from said bidirectional data line; first means for initiating writes of data to and reads of data from said memory component on said bidirectional data line, said first means producing by a first point in time a valid indication signal indicating that one of a data read and a data write is being initiated; and second means for setting said control line to said first electrical state at a second point in time prior to said first point in time and for maintaining said control line in said first electrical state independently of said indication signal from said second point in time to said first point in time; wherein said first means carries out a plurality of memory access cycles which include first and second memory access cycles, each memory read and memory write being effected during a respective one of said memory access cycles, said first point in time occurring a first predetermined time interval after the start of said first memory access cycle; and wherein said second point in time occurs a second predetermined time interval after an end of said second memory access cycle which immediately precedes said first memory access cycle, said second predetermined time interval being less than said first predetermined time interval.

6. An apparatus as recited in claim 5, wherein said second predetermined time interval is approximately half as long as said first predetermined time interval.

7. A method of controlling an apparatus which includes a high speed memory component having a bidirectional data line and having a control line which, when respectively set to first and second electrical states, causes said memory component to respectively output data onto and accept data from said bidirectional data line, and means for initiating writes of data to and reads of data from said memory component on said bidirectional data line, and for producing by a first point in time a valid indication signal indicating that one of a data read and a data write is being initiated; comprising the steps of: setting said control line to said first electrical state at a second point in time prior to said first point in time, and maintaining said control line in said first electrical state independently of said indication signal from said second point in time to said first point in time.

8. A method as recited in claim 7, further including the step of changing said control line of said memory component from said first electrical state to said second electrical state in response to said indication signal indicating at said first point in time that a data write to said memory component is being initiated.

9. A method of controlling an apparatus which includes a high speed memory component having a bidirectional data line and having a control line which, when respectively set to first and second electrical states, causes said memory component to respectively output data onto and accept data from said bidirectional data line, and means for initiating writes of data to and reads of data from said memory component on said bidirectional data line, and for producing by a first point in time a valid indication signal indicating that one of a data read and a data write is being initiated; comprising the steps of: setting said control line to said first electrical state at a second point in time prior to said first point in time; maintaining said control line in said first electrical state independently of said indication signal from said second point in time to said first point in time; and supplying an address to said memory component at a third point in time prior to said first point in time and subsequent to said second point in time.

10. A method as recited in claim 9, further including the steps of carrying out a plurality of memory access cycles which include first and second memory access cycles, each memory read and memory write being effected during a respective one of said memory access cycles, said first point in time occurring a first predetermined time interval after a start of said first memory access cycle and said second point in time occurring a second predetermined time interval after an end of said second memory access cycle which immediately precedes said first memory access cycle, and selecting said second predetermined time interval to be less than said first predetermined time interval.

* * * * *